V. PUC.
SEPARABLE FASTENER.
APPLICATION FILED AUG. 1, 1919.
1,361,096.
Patented Dec. 7, 1920.
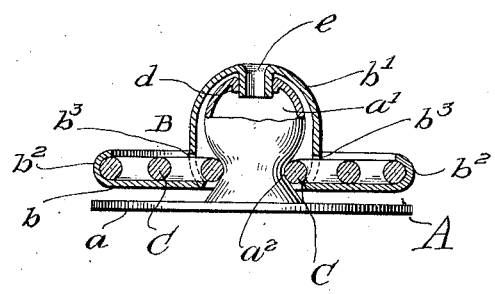
Inventor
*Vojtech Puc*
By his Attorneys
*Baldwin Wight*

UNITED STATES PATENT OFFICE.

VOJTECH PUC, OF PRAGUE-VINOHRADY, BOHEMIA.

SEPARABLE FASTENER.

1,361,096.

Specification of Letters Patent.

Patented Dec. 7, 1920.

Application filed August 1, 1919. Serial No. 314,761.

*To all whom it may concern:*

Be it known that I, VOJTECH PUC, a citizen of the Czecho-Slovak Republic, residing at Prague-Vinohrady, in Bohemia, have invented certain new and useful Improvements in Separable Fasteners, of which the following is a specification.

This invention relates to separable fasteners of the kind generally known as press buttons or snap fasteners, and which are composed of two members, a stud member and a socket member, which latter carries springs which engage the stud when the latter is in the socket.

The object of the present invention is to provide novel means for more securely holding the stud in the socket so that it may not be withdrawn therefrom except by design.

The accompanying drawing is a sectional view of a snap fastener embodying my improvements.

The fastener comprises a stud member A and a socket member B.

The stud member consists of a base $a$ and a stud or head $a'$, having a contracted neck $a^2$.

The socket member comprises a base plate $b$ and a cap, hood or socket $b'$. The base plate is curled at its edge $b^2$, and the cap, hood or socket is slotted at $b^3$. The base plate also has an opening to receive the stud. A spring C is supported on the base plate on the socket member in the usual way and parts thereof are adapted to pass through the slots $b^3$ as usual and engage the stud.

It will be observed that the opening in the base plate $b$ of the socket member through which the head of the stud passes is more narrow than the greatest diameter of the socket, being made in fact just wide enough to allow the stud to enter, and this opening is narrower than that part of the cap in which the slots $b^3$ are formed and considerably narrower than the widest part of the socket. By this construction, strain exerted laterally on the head of the stud will not cause the disengagement of the members. The edge of the opening forms a stop which serves to hold the lower part of the head as soon as the latter is moved laterally by strain exerted in a sidewise direction, but in order to entirely prevent a rocking movement of the stud member in the socket member the stud member $a'$ is formed with an opening at its top which is surrounded by an inturned flange $d$ and the socket member is formed at the center of the cap with an inwardly extending projection $e$ which when the two members are connected extends into the opening $d$ and locks them against a rocking movement so that there is absolute security against any possibility of the two members being separated by the rocking or tilting of the members, it being necessary to withdraw one member from the other in a straight line or axially in order that the projection $e$ may be withdrawn from the opening in the stud and even after this is done the stud cannot be readily separated from the socket by a rocking or tilting movement or a lateral strain, but must be withdrawn axially therefrom.

I claim as my invention:—

1. A separable fastener, comprising a sheet metal stud member and a sheet metal socket member, one of said members being formed at its outer end with an opening surrounded by a straight, rigid flanged bearing and the other member being formed at its outer end with an integral, rigid, straight projection which enters the flanged bearing in the companion member of the fastener and is adapted to move axially therein without rocking.

2. A separable fastener, comprising a sheet metal stud member formed at its outer end with an opening surrounded by a straight, rigid flanged bearing, and a sheet metal socket member formed at its outer end with a rigid, straight, inwardly extending projection which enters the flanged opening in the companion member of the fastener and is adapted to move axially therein without rocking.

3. A separable fastener, comprising a sheet metal stud member formed at its outer end with an opening surrounded by a straight, rigid, flanged bearing, and a sheet metal socket member comprising a flanged base and a cap having side openings near the base to receive portions of a retaining spring and having a central opening to receive the stud member which is materially narrower than that portion of the cap having slotted sides, said cap being formed at its outer end with an integral, rigid, straight projection which enters the opening in the companion member of the fastener and is adapted to move axially therein without rocking.

4. A separable fastener, comprising a sheet metal stud member formed at its outer end with an opening surrounded by a straight, rigid, flanged bearing, and a socket member having a base formed with an opening of substantially the same diameter as the widest part of the stud having a cap portion materially wider than the stud and having spring-receiving openings in its sides in a portion of the cap wider than the central opening of the stud and which is formed at its outer end with an integral, rigid, inwardly-extending straight projection which enters the opening in the outer end of the stud, and a spring mounted in the base plate the ends of which extend through the walls in the cap and engage the stud.

5. A separable fastener, comprising a sheet metal stud member and a sheet metal socket member, the stud member being held near its inner end by a spring carried by the socket member and being held at its outer end by a projection extending inwardly from said socket member.

In testimony whereof, I have hereunto subscribed my name.

VOJTECH PUC.